June 27, 1950 — D. KAPUCZIN — 2,512,863
MEASURING INSTRUMENT
Filed Feb. 10, 1945
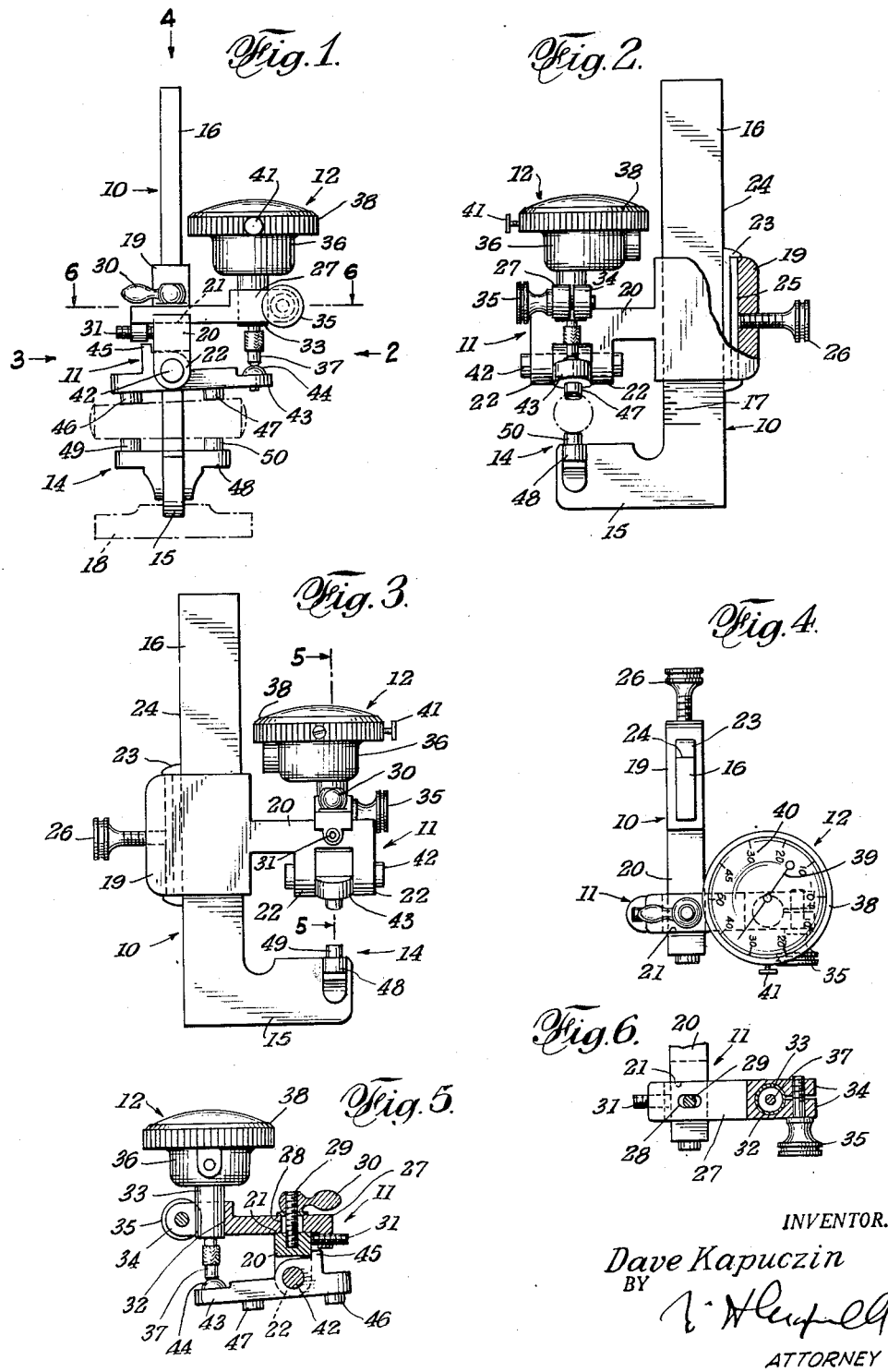
INVENTOR.
Dave Kapuczin Patented June 27, 1950

2,512,863

UNITED STATES PATENT OFFICE 2,512,863

MEASURING INSTRUMENT

Dave Kapuczin, Mentone, Calif.

Application February 10, 1945, Serial No. 577,209

6 Claims. (Cl. 33—174)

1

This invention relates to means for measuring tapers or slopes and deals more particularly with instruments for obtaining micrometric measurements of the degree of taper of round or polygonally shaped objects such as bars or shafts and, also, for obtaining similar measurements of the angle of slope of flat wedge-shaped articles.

An object of the invention is to provide a gauging device for tapers or slopes which is simple in operation, readily and quickly adjusted, and provided with means for obtaining universal adjustment of the parts for the accurate measurement of tapers or slopes or articles such as rods, bars, or shafts.

Another object of my invention is to provide a taper or slope measuring instrument having extreme flexibility of use whereby said instrument may be used either for inspecting a large number of like articles to quickly determine whether such articles are made within specified tolerance limits, or for obtaining the measurement of the taper or slope of individual or specially made objects, parts or articles.

The invention is particularly characterized by simplicity, compactness, accuracy, flexibility and speed of use.

The various objects and features of my invention will be fully understood from the following detailed description of a typical preferred form and application of the invention, throughout which description reference is made to the accompanying drawings, in which:

Fig. 1 is a front elevational view of a measuring instrument according to the present invention.

Fig. 2 is a side view thereof as seen in the direction of the arrow 2 of Fig. 1, parts being broken away.

Fig. 3 is a similar view in the direction of the arrow 3 of Fig. 1.

Fig. 4 is a plan view.

Fig. 5 is a vertical sectional view on the line 5—5 of Fig. 3.

Fig. 6 is a fragmentary plan sectional view on the line 6—6 of Fig. 1.

In the preferred form of the invention illustrated in the drawing, the taper or slope measuring instrument comprises essentially a support or frame 10, an adjustable gauging bracket 11 carried by the frame, a dial indicator 12 carried by the bracket 11, a work rest 14, and a pivoted lever 43 carried by the bracket engageable with the work and operating the indicator.

The support or frame 10 may be provided with a foot or base portion 15 and with an integrally formed upstanding post 16. The base and post form an L-shaped member, as shown. The post 16 may be provided with a scale or graduations 17. The instrument may be supported on any suitable rest or the foot 15 may be clamped in a vise when in use. If desired a frame support 18 may be provided to hold said base to support the instrument in an upright position as seen in Fig. 1.

The gauging bracket 11 may comprise a sleeve portion 19 engaged over or around post 16 and an arm 20 integrally formed with said sleeve to project horizontally or laterally and having overstanding relation to the base 15 of the frame 10. The arm 20 may be provided with a notch or seat 21 in its upper face and with spaced down-reaching leg portions 22 below the seat. It will be seen that the gauging bracket 11 may be moved vertically along the post 16 and, in order to clamp said bracket on said post in the desired adjusted position, clamping means are provided. The clamping means may comprise a clamp shoe 23 engaged against the edge surface 24 of the post, means such as the flat bowed spring 25 in contact with the shoe 23, and a clamp screw 26 carried by the sleeve 19 and impinging on the spring 25.

A gauge arm 27 is carried in the seat 21 of the bracket 11 to extend transversely of arm 20. In order to afford transverse adjustability of said arm 27, it may be provided with a slot 28, or the like, passing a threaded stem 29 carried by the arm 20. A locking nut or handle 30 is threaded on said stem for locking or clamping the arm 27 in adjusted position. Extreme accuracy in this adjustment may be obtained by means such as a jack screw 31 carried by the arm 27 and having engagement with one side of the arm 20.

The dial indicator may be carried by the arm 27. For this purpose the outer or projecting end portion of said arm may be formed with a seat 32 carrying the shank 33 of the dial indicator 12. The end portion of arm 27 is split or bifurcated to have spaced portions 34 and a clamp screw 35 connects said portions for clamping the shank 33 of the dial indicator to the arm 27 so it depends vertically from the arm.

The dial indicator 12 may be of typical design comprising a casing 36 which is carried by the upper end portion of shank 33, a gauging stem 37 depending from the shank, and dial means 38 on the case. The latter, in the usual manner, may comprise an index pointer 39 and a dial 40. It is preferred to use that type of dial indicator in which zeroizing of the dial may be accomplished by rotating the dial 40 with respect to the index pointer 39 and locking the parts in zeroized position, as by a screw 41.

The legs 22 of the bracket arm 20 carries a pivot pin 42 which serve as a fulcrum for and to pivotally mount the rocker lever 43. The latter has an arm provided with a projecting end carrying an upwardly faced rounded or dome shaped rest 44 having operational engagement with the feeler end of the dial indicator stem 37. The rest may be shaped so that the effect upon the length of the lever arm between the fulcrum pin 42 and the point of engagement of said rest and the stem 37 is minimized as the structure operates. Said lever may also be provided with stop means such as the lug 45 adapted to engage a portion of the arm 20. Spaced upwardly projecting gauging studs or pins such as shown at 46 and 47 are provided on the lever 43, said studs being arranged on either side of the pivot point of said lever and spaced apart a specified amount, such as one inch.

The rest 14 may comprise a fixed or stationary cross member 48 carried by the base 15 and arranged transversely with respect thereto, and said member 48 may be provided with spaced upwardly projecting rest pins or studs 49 and 50 paired with studs 46 and 47 of the lever 43.

The instrument above described has many uses. One use is to employ the same for inspecting a large quantity of taper pins, for instance, to determine whether the pins are made within their tolerance limits. For this purpose the instrument would be set up as follows:

A taper pin of known and desired taper would be placed upon the rest, studs 49 and 50 and the bracket 11 moved down until the gauging studs 46 and 47 both encounter said pin. Then, by adjusting the transverse arm 27 and by rotating the dial means 38 of the indicator, the index pointer may be placed on zero of the dial 40. The means 30 and 41 may then be locked or clamped. The taper pins to be gauged are then slid horizontally between the studs 46, 47, 48 and 49 and the lever 43 will assume a position in accordance with the taper of each pin so positioned. The position of the lever 43 will, of course, determine the degree of movement of the indicator stem 37 and thus of the index pointer 39 with respect to the dial 40. If the index pointer points to zero on the dial, or within the desired tolerance limits, then such a taper pin is considered good. If, however, the pointer finds a position remote from zero and beyond the tolerance limits, that taper pin is faulty in its taper and is rejected. It is evident that rapid and accurate inspection of large quantities of articles such as taper pins may be made by the present instrument. It may also be seen that the instrument need not, necessarily, be accurately made, inasmuch as ample provision is provided for effecting accurate positioning of the parts which may be readily readjusted for wear of the gauging studs, and for other reasons.

A specially made part having a given taper may also be gauged. The procedure is as follows:

A cylindrical member, having a diameter substantially comparable to the mean diameter of the part to be gauged or measured, is positioned between the gauging studs and the dial indicator adjusted to zero. The part to be gauged is then placed between said studs and a reading made on the dial. Said dial may be variously graduated for this purpose. It may be graduated in thousandths of an inch, in degrees of a circle, or in any suitable manner which will read the tilt of the lever 43 with respect to a horizontal zero position thereof.

The indicator dial 40 may be graduated in a manner so that any of the desired type of reading may be had and therefor may have thereon two or more scales, as can be understood.

Other tapers or slopes may be measured by the instrument herein disclosed, the device being applicable to other items of whatever shape and including flat wedge-shaped members such as certain shaft keys.

Having described only a typical preferred form and application of my invention, I do not wish to be limited or restricted by the specific details herein set forth, but wish to reserve to myself any variations or modifications that may appear to those skilled in the art and fall within the scope of the following claims:

Having described my invention, I claim:

1. A taper measuring instrument including, a rigid frame having a base and a vertically disposed post, upwardly faced fixed horizontally spaced gauge pins supported from the base in horizontal spaced relation in a vertical plane laterally spaced from the post, a bracket carried by the post for adjustment therealong and projecting laterally from the post to intersect said vertical plane, a lever pivotally mounted on the bracket on a horizontal axis normal to said vertical plane and to overlie the base, gauge pins in fixed spaced relation lengthwise of the lever in opposite directions from the pivotal mounting of the lever and depending from the lever over the first mentioned pins, and a gauge supported from the bracket to be stationary relative thereto and operatively engaged by a portion of the lever horizontally spaced from the pivotal mounting of the lever.

2. A taper measuring instrument including, a rigid frame having a base and a vertically disposed post, upwardly faced gauge pins supported from the base, a bracket carried by the post for adjustment therealong, a lever, a horizontally disposed pivot pin connecting the lever with the bracket and supporting the lever over the base with arms projecting in opposite directions horizontally from the pivot pin, gauge pins depending from the arms of the lever above the first mentioned pins, one arm of the lever having an end portion projecting outward beyond the pin carried by said arm, and a gauge supported from the bracket and operatively engaged by said end portion of the said lever arm.

3. A taper measuring instrument including, a rigid frame having a base and a vertically disposed post, upwardly faced gauge pins supported from the base, a bracket carried by the post for adjustment therealong and having a laterally projecting portion, a horizontally adjustable arm carried by said portion of the bracket, a lever pivotally carried by the said portion of the bracket and overlying the base, depending gauge pins carried by the lever over the first mentioned gauge pins, and a gauge carried by the arm and operatively engaged by the lever.

4. A taper measuring instrument including, a rigid frame having a base and a vertically disposed post, upwardly faced gauge pins fixed on the base, a bracket carried by the post for movement therealong and having a horizontally projecting portion, a horizontally disposed arm carried by the said portion of the bracket, means adjusting the arm transversely of said portion of the bracket, a lever, a horizontal pivot pin mounting the lever on the arm to overlie the base, depending gauge pins fixed on the lever above the first mentioned pins, and a gauge carried by the arm with a depending stem over said lever, the lever having a projecting end portion engaging the stem.

5. A taper measuring instrument including, a rigid frame having a base with a cross member carrying upwardly projecting gauge pins and having a vertical post, a bracket having a sleeve adjustable along the post and having a horizontal projection extending transversely of the cross member, an arm carried by the projection and extending over the cross member and parallel therewith, means adjusting the arm transversely of the projection, a lever, a horizontal pivot pin connecting the lever with the projection to extend over the cross member and parallel therewith, the lever having fixed depending gauge pins over the first mentioned pins, and a gauge carried by the arm with a depending stem engaging the lever.

6. A taper measuring instrument including, a frame having a base and a post projecting vertically from the base, a bracket having a sleeve slidable on the post and having an arm projecting laterally from the sleeve and having a transverse seat in its upper side and having depending legs at its lower side below the seat, clamp means securing the sleeve on the post, a gauge arm slidably supported in the seat and projecting laterally from the first mentioned arm and having a vertical opening in its outer end, a dial indicator having a shank carried in said opening and a gauge stem depending from the shank, means setting the shank in the opening, a lever, a pivot pin carried by the legs and engaging the lever to connect it with the legs on a horizontal pivotal axis, gauging pins depending from the lever and located in opposite directions horizontally from the pivot pin, one arm of the lever having an end portion projecting beyond the pin carried by said arm to a point beneath the stem, a dome shaped rest on said end portion of said lever arm engaging the stem, and a cross member fixed to the base beneath the lever, and upwardly projecting pins on the said member, the pins of the lever and the pins of the said member being spaced apart vertically for an object to be moved horizontally into position between them.

DAVE KAPUCZIN.

REFERENCES CITED

The following references are of record in the file of this patent:

UNITED STATES PATENTS

| Number | Name | Date |
| --- | --- | --- |
| 501,807 | Peterson | July 18, 1893 |
| 996,901 | Ball | July 4, 1911 |
| 1,281,715 | Todt | Oct. 15, 1918 |
| 1,339,639 | Voigt | May 11, 1920 |
| 1,389,381 | Renton | Aug. 30, 1921 |
| 1,413,232 | Miolla | Apr. 18, 1922 |
| 1,477,688 | Buckwalter | Dec. 18, 1923 |
| 1,478,954 | Hardaker | Dec. 25, 1923 |
| 1,582,249 | Cumiskey | Apr. 27, 1926 |
| 1,592,118 | McBain | July 13, 1926 |
| 2,412,569 | Dugger | Dec. 17, 1946 |